United States Patent [19]

Bisiach

[11] Patent Number: 4,551,903
[45] Date of Patent: Nov. 12, 1985

[54] AUTOMATIC TOOL CHANGING MECHANISM FOR INDUSTRIAL ROBOTS

[76] Inventor: Luciano Bisiach, Strada Comunale San Vito-Revigliasco, 350, 10133 Turin, Italy

[21] Appl. No.: 612,912

[22] Filed: May 22, 1984

[30] Foreign Application Priority Data

Feb. 13, 1984 [IT] Italy ................. 67130 A/84

[51] Int. Cl.⁴ .................. B23K 9/12; B23Q 3/155
[52] U.S. Cl. .................... 29/568; 219/86.8; 219/125.1; 339/16 RC; 901/42; 29/26 A
[58] Field of Search ........... 29/568, 26 A; 408/35; 414/736, 749, 753; 901/16, 37, 42, 46; 219/86.7, 219/86.8, 125.1; 339/16 RC

[56] References Cited

U.S. PATENT DOCUMENTS 4,281,447 8/1981 Miller et al. ............. 29/568
4,310,958 1/1982 Balaud et al. ............. 29/26 A
4,409,464 10/1983 Favareto et al. .......... 219/125.1 X

*Primary Examiner*—Z. R. Bilinsky
*Attorney, Agent, or Firm*—Paul & Paul

[57] ABSTRACT

An automatic tool changing mechanism for industrial robots, comprising a coupling device mounted on a toolholder head of the robot, and a connection plate complementary to the coupling device and firmly secured to the tool, this latter being accommodated in a toolholder magazine. Fixing of the two parts to each other is effected by rotation of a segmental crown gear mounted on the toolholder head and driven by actuator means mounted on the toolholder magazine. The mechanism further comprises a plurality of electrical and fluid connections energized simultaneously with the mechanical connection of the two parts and interrupted automatically on their separation.

12 Claims, 12 Drawing Figures

AUTOMATIC TOOL CHANGING MECHANISM FOR INDUSTRIAL ROBOTS

BACKGROUND OF THE INVENTION

This invention relates to an automatic tool changing mechanism for industrial robots to permit programmed replacement of the tool during machining without human intervention and without interruption of the working cycle of the robot. The invention is particularly advantageous in case of bulky or heavy tools and/or tools requiring burdensome connections for power, signals, operating fluids such as water, compressed air, etc., as in the case where the tool is constituted by resistance welding guns or welding yokes although the invention is not limited to such applications.

Hitherto the operation of changing the tool, in particular the welding gun, had to be carried out manually by an operator while the machine was stopped and thus could not be included in an automated working cycle. Thus, the industrial robot, which had been developed to provide maximum versatility of operation due to its great freedom of movement, in practice was paradoxically limited in efficacy by the necessity of having to use one tool for the entire programmed working cycle unlike other numerically controlled machine tools of far less agility such as the so-called machining centers the very attraction of which consists in the possibility of using successively different tools taken from a toolholder magazine during the cycle of working on a workpiece.

It would therefore be desirable to provide the industrial robot with the possibility of changing the tool rapidly and automatically during the programmed cycle in the same manner as is already done in machining centers so that the industrial robot would itself acquire the characteristics of a machining center. The attemps hitherto made for automatically changing the tool on industrial robots have thus proved unsuccessful, particularly in the field of welding.

In fact, in the case of welding robots, on the one hand, one works with particularly heavy and bulky welding guns, which in themselves constitute a heavy strain on the sturdiness of the toolholder head of the robot, and on the other hand, for changing the tool it is necessary to interrupt and subsequently restore numerous service connections for the tool (such as compressed air, cooling water, etc.) including feeding of current of tens of thousands of amperes at low tension to the welding gun.

It is an object of the present invention to provide an automatic tool changing mechanism which permits to change a tool on an industrial robot automatically and rapidly and in timed relation with the working program without rendering the toolholder head of the robot unduly heavy or bulky.

Another object of the present invention is to provide an automatic tool changing mechanism which is capable of effecting in a simple and reliable manner the interruption and restoration of the service connections of the tool, in particular the feeding of electric power, even with heavy currents and low tensions.

SUMMARY OF THE INVENTION

The above and other objects and advantages of the invention, which will become apparent from the following description, are achieved according to the invention by an automatic tool changing mechanism for industrial robots with a toolholder head having several axes of movement and provided with a toolholder end flange, characterized in that it comprises:

(a) a connection plate firmly secured to the tool and having a projection provided with a plurality of radial lugs and a corresponding plurality of resiliently compressible retainer means mounted respectively on each radial lug;

(b) a device for coupling the tool to the robot by means of the connection plate, said device comprising a hollow cylinder firmly anchored to the end flange of the toolholder head of the robot, and an annular surface adapted to engage said projection of the connection plate of the tool and a cylindrical outer surface on which a segmental crown gear is rotatably supported which forwardly has a plurality of claws adjacent said radial lugs of the connection plate and, peripherally, engagement means engageable for rotating the segmental crown gear by means of an external actuator from a first unlocked position to a second locked position and vice versa;

(c) a toolholder magazine comprising a frame arranged in a predetermined fixed position with respect to the robot to accommodate a tool with said connection plate in a predetermined position and having an actuator member adapted to engage said engagement means on the segmental crown gear when the coupling device is in a position engaging said projection for rotating the segmental crown gear from the unlocked position to the locked position and vice versa;

so that by moving the coupling device forwardly up to the connection plate of the tool located in the magazine, with the crown gear in the unlocked position, the claws are released by said radial lugs and the engagement means of the crown gear are gripped by said actuator member on the magazine, and so that, when by actuation of said actuator member the crown gear is moved into the locked position, said claws move behind the radial lugs and grip the resilient retainer means to create a pressure between said annular surface of said hollow cylinder and the projection whereas by moving the actuator member in the opposite direction the crown gear is returned to the unlocked position to release said claws and thus the coupling device from said connection plate.

A further important feature of the present invention, for a robot of the type with two electric power feeding conductors extending through the head, consists in that:

(a) the hollow cylinder has in its center area a pair of plates provided with respective opposed electric contact surfaces extending parallel to the axis of the hollow cylinder, with said plates connected to said conductors, and respective jaws each facing one of said plates and carried by pressure means mounted on the hollow cylinder and adapted to move the jaws against the plates under the action of the rotation of the crown gear from the unlocked position to the locked position; and (b) the connection plate of the tool carries a pair of electric contact plugs yieldingly supported in such a position as to be inserted each between one of said plates and one of said jaws when the coupling device moves forwardly up to the connection plate of the tool with the crown gear in the unlocked position, the contact plugs being compressed between the jaws and the plates as the crown gear moves into the locked position.

DESCRIPTION OF PREFERRED EMBODIMENT

Figure 2:
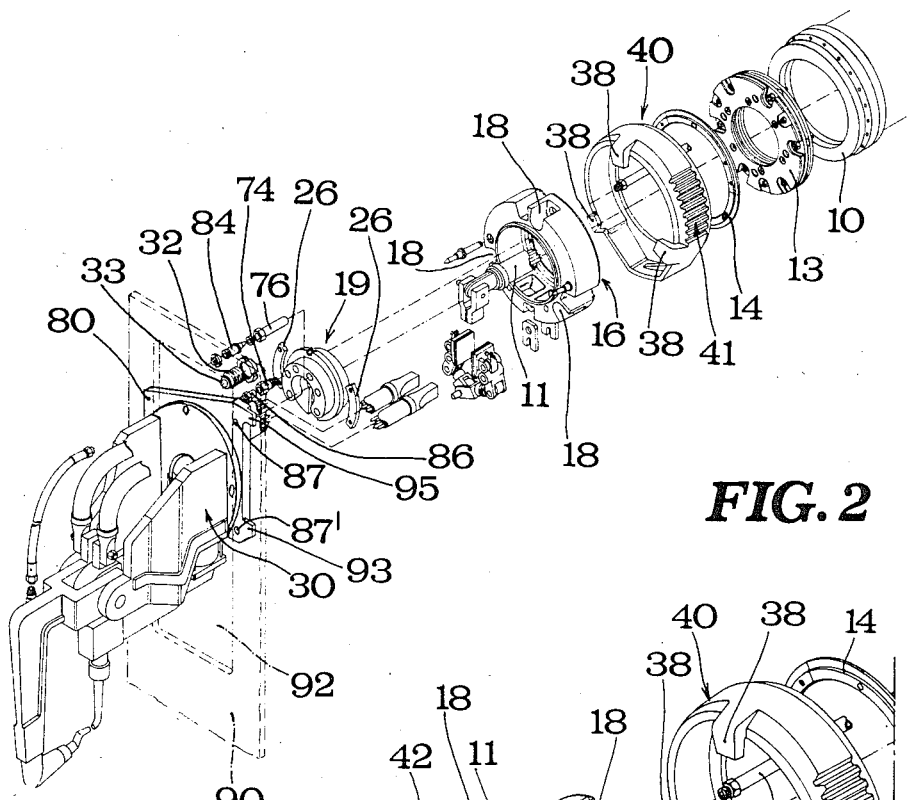
FIG. 2 is an exploded perspective view of an automatic tool changing mechanism according to the preferred embodiment of the invention.
Figure 3:
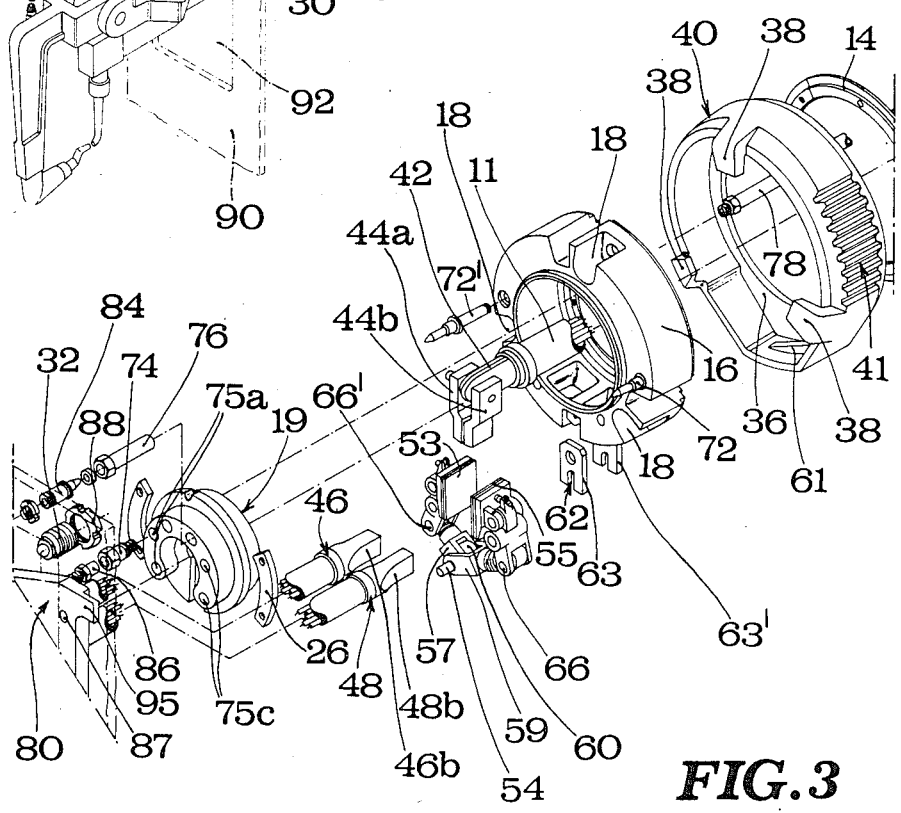
FIG. 3 is an enlarged exploded perspective view of a portion of the mechanism of FIG. 2.

As shown particularly in FIGS. 2 and 3, a toolholder head 10 of a welding robot according to applicant's prior Italian Patent Application No. 68.126-A/77 is of the hollow type and accommodates in its interior current feeding conductors 11 as well as water and compressed air feeding hoses as 78. The toolholder head 10 carries a toolholder end flange 13.

According to the invention a hollow cylinder 16 is secured to the end flange 13 by screws as 20 (FIG. 4), this cylinder having forwardly an annular projection 16a defining a center cylindrical cavity. A segmental crown gear 40 is rotatably mounted on the peripheral jacket of hollow cylinder 16 and is axially retained by an edge 36 engaging between a shoulder 21 of hollow cylinder 16 and a retaining ring 14 secured by screws 25. Forwardly segmental crown gear 40 has three undercut claws 38 spaced at 120°. The outer surface of segmental crown gear 40 is provided with a toothed segment 41 (FIG. 3). Hollow cylinder 16 has three front recesses 18 and a pair of plugs 72, 72' extending parallel to the axis of the hollow cylinder for purposes which will be described hereinafter.

Figure 4:
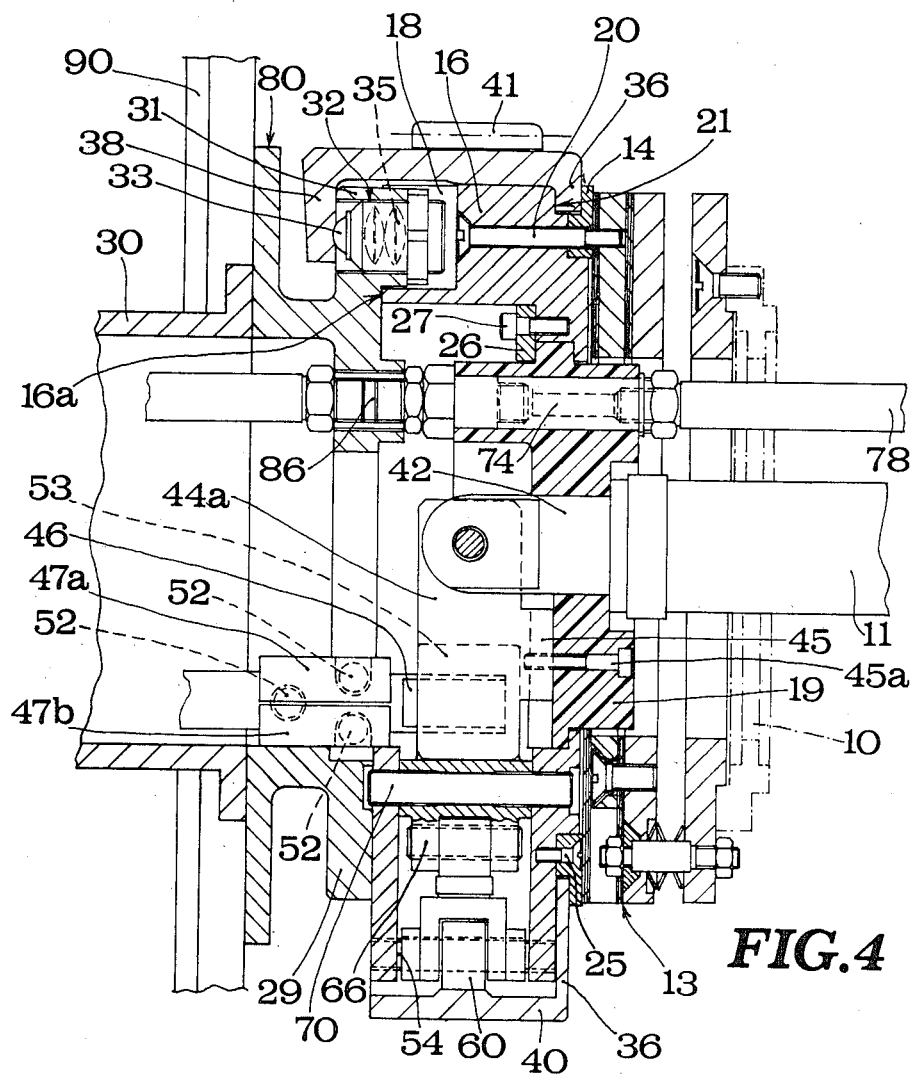
FIG. 4 is an axial section of the automatic tool changing mechanism in the assembled condition.
Figure 7:
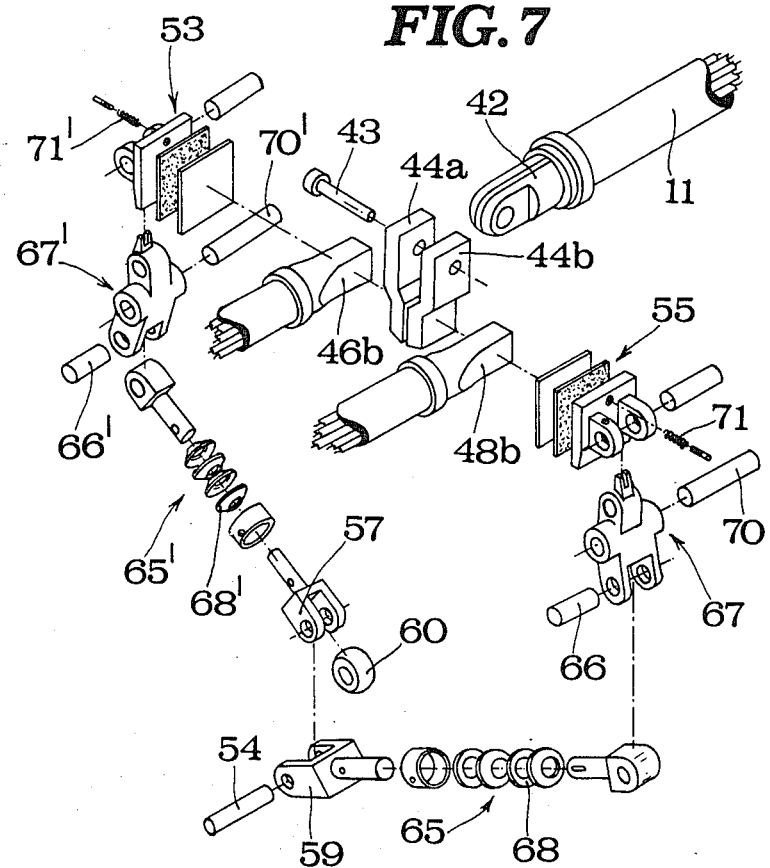
FIG. 7 is an enlarged exploded view of pressure means forming part of the device of FIG. 1.

A cylindrical body 19 of plastics material is accommodated in the center cavity of hollow cylinder 16 and is retained by plates 26 secured by screws 27 (FIG. 4). Cylindrical body 19 is traversed by a bipolar end 42 of a current feed cable 11. Secured to the end 42 of current feed cable 11 by means of a pin 43 (FIG. 7) is a pair of conductor plates 44a and 44b extending radially and having plane parallel outer contact surfaces with rearward projections 45 (FIG. 4) for supporting them on the body 19, the projections 45 being anchored by screws as 45a.

Figure 9:
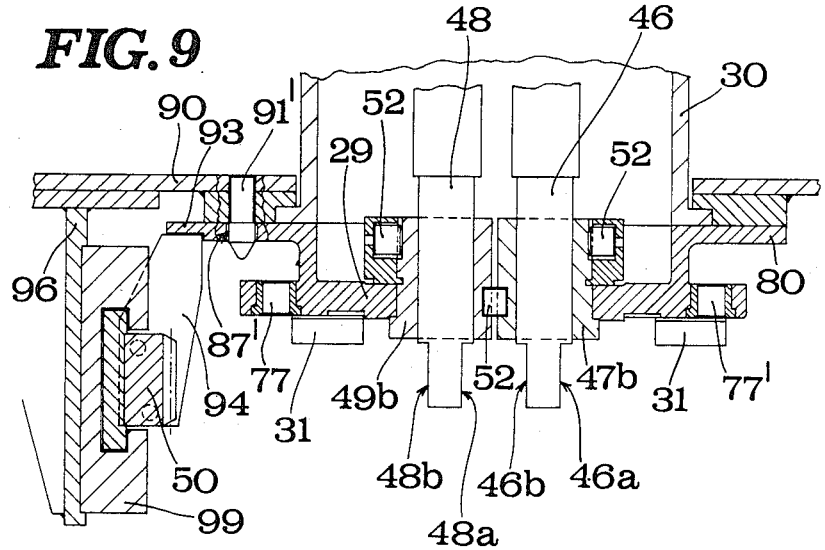
FIG. 9 is a section taken along the line IX—IX of FIG. 8.

Further, pressure means are mounted in the hollow cylinder 16 for clamping electric contact plugs (described hereinafter) against the contact surfaces of plates 44a, 44b, these pressure means comprising a pair of plane jaws 53, 55 (FIGS. 3 and 7) carried by respective rocker arms 67, 67' hinged on pivots 70, 70' firmly secured to the hollow cylinder, with the rocker arms arranged symmetrically with respect to plates 44a, 44b and their opposed ends articulated to arms or struts 65, 65' by means of pivots 66, 66'. The opposite ends of struts 65, 65' are fork-shaped as shown at 57, 59 (FIG. 7) and connected to each other by means of a pivot 54 carrying a cam follower 60. The latter engages a cam surface 61 (FIG. 9) provided in the interior of segmental crown gear 40 so that the cam follower will move toward and away from the axis of hollow cylinder 16 as the latter rotates between an unlocked and a locked position. Pivot 54 is guided by slots 62 provided in plates 63, 63' secured to hollow cylinder 16. The jaws 53, 55 are yieldingly retained by springs 71, 71' (FIG. 7) in substantially parallel positions relative to plates 44a, 44b. The struts 65, 65' are resiliently compressible due to respective series of Belleville springs 68, 68' which form their axial bodies.

Cylindrical body 19 has several holes 75a, 75b, 75c which accommodate connectors 74, 76 (FIG. 3) for the cooling circuits (water) and feeding of compressed air to the tool, these connectors being connected to pipes 78 extending through the toolholder head of the robot.

Now a connection plate with which a welding gun is provided according to the teachings of the present invention will be described.

Figure 1:
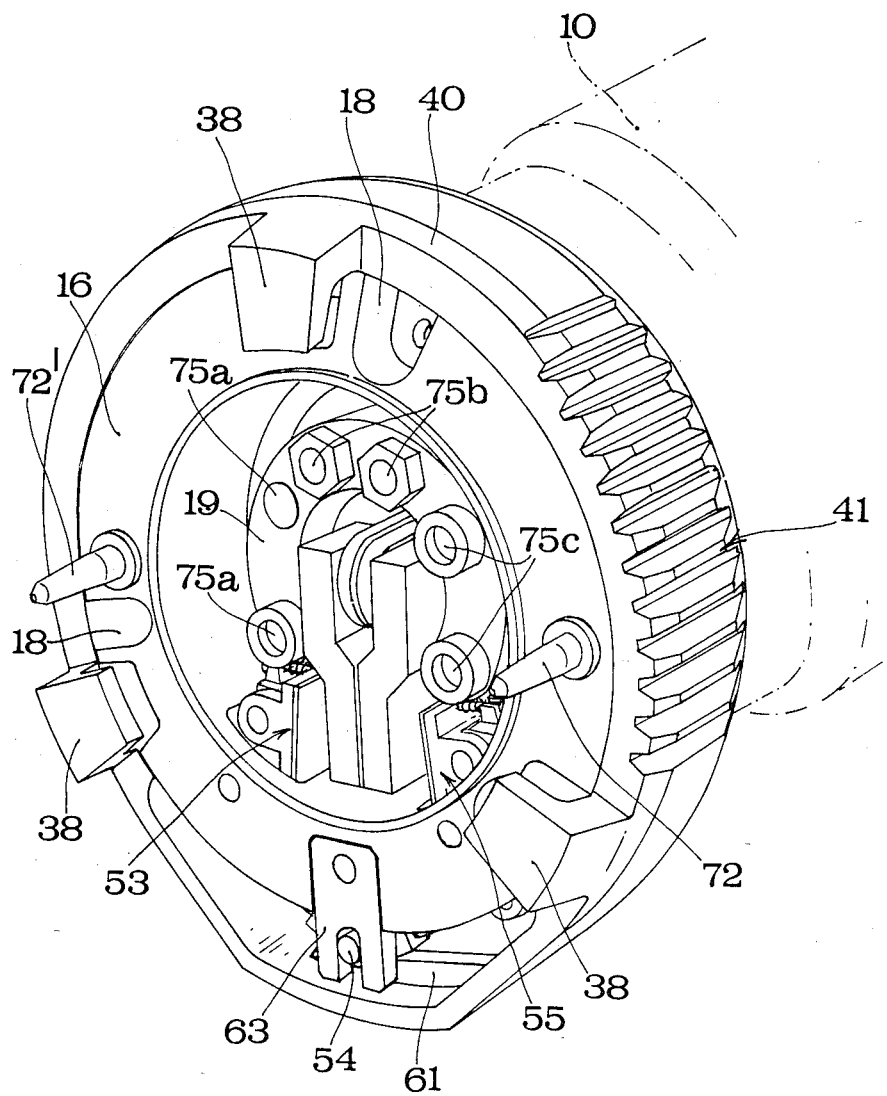
FIG. 1 is a perspective view of a tool coupling device to be mounted on a toolholder head of a welding robot, this coupling device forming part of an automatic tool changing mechanism according to a preferred embodiment of the invention in which the tool is constituted by a welding gun.
Figure 5:
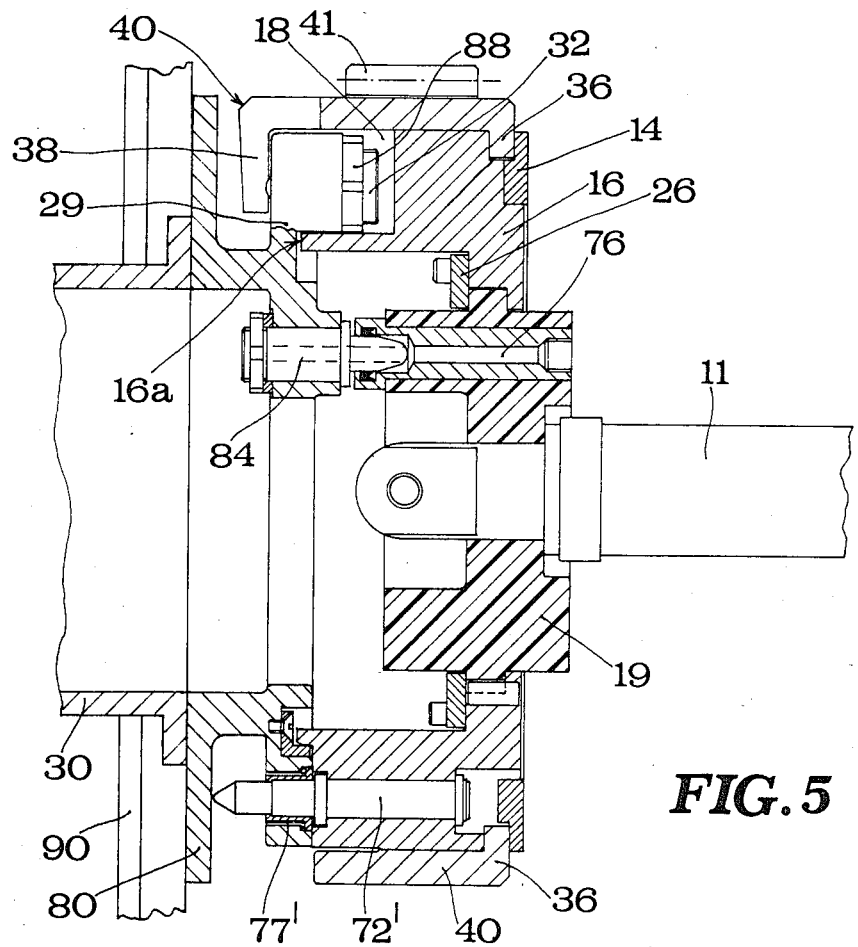
FIG. 5 is an axial section similar to FIG. 4, but with the section taken on different planes.
Figure 6:
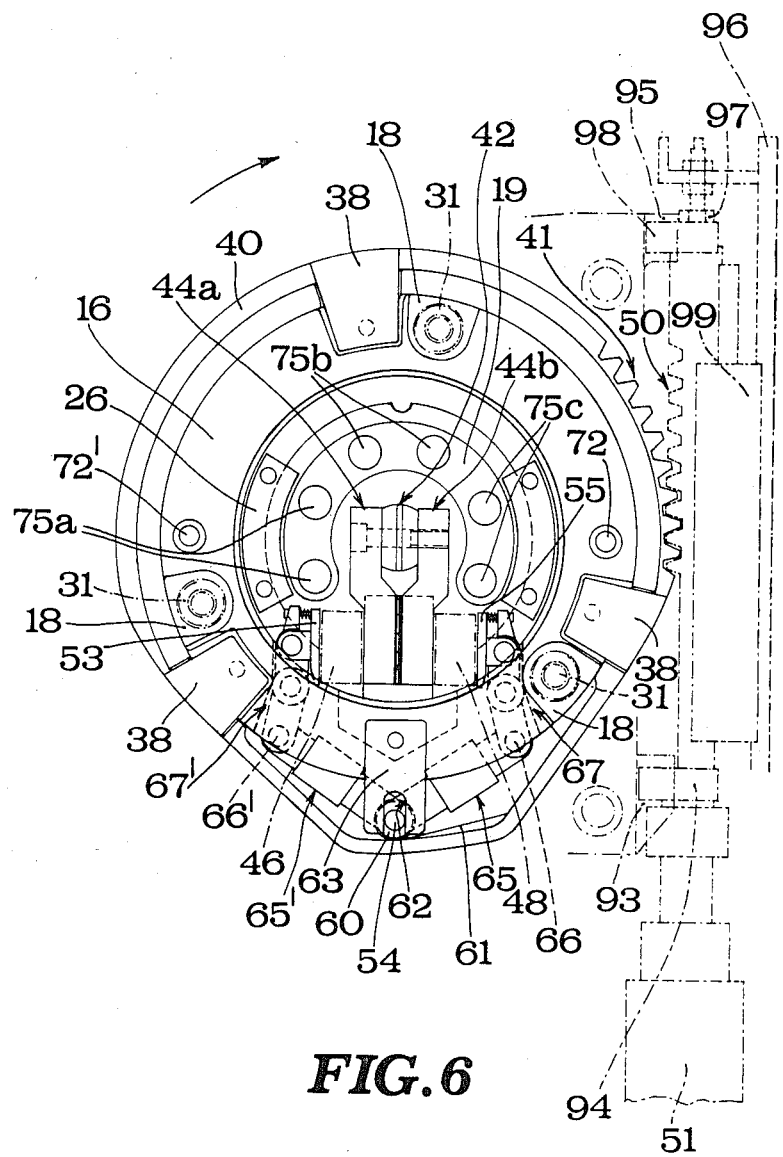
FIG. 6 is a front view of the device of FIG. 1 in the unlocked position of operation, showing external actuator means.
Figure 8:
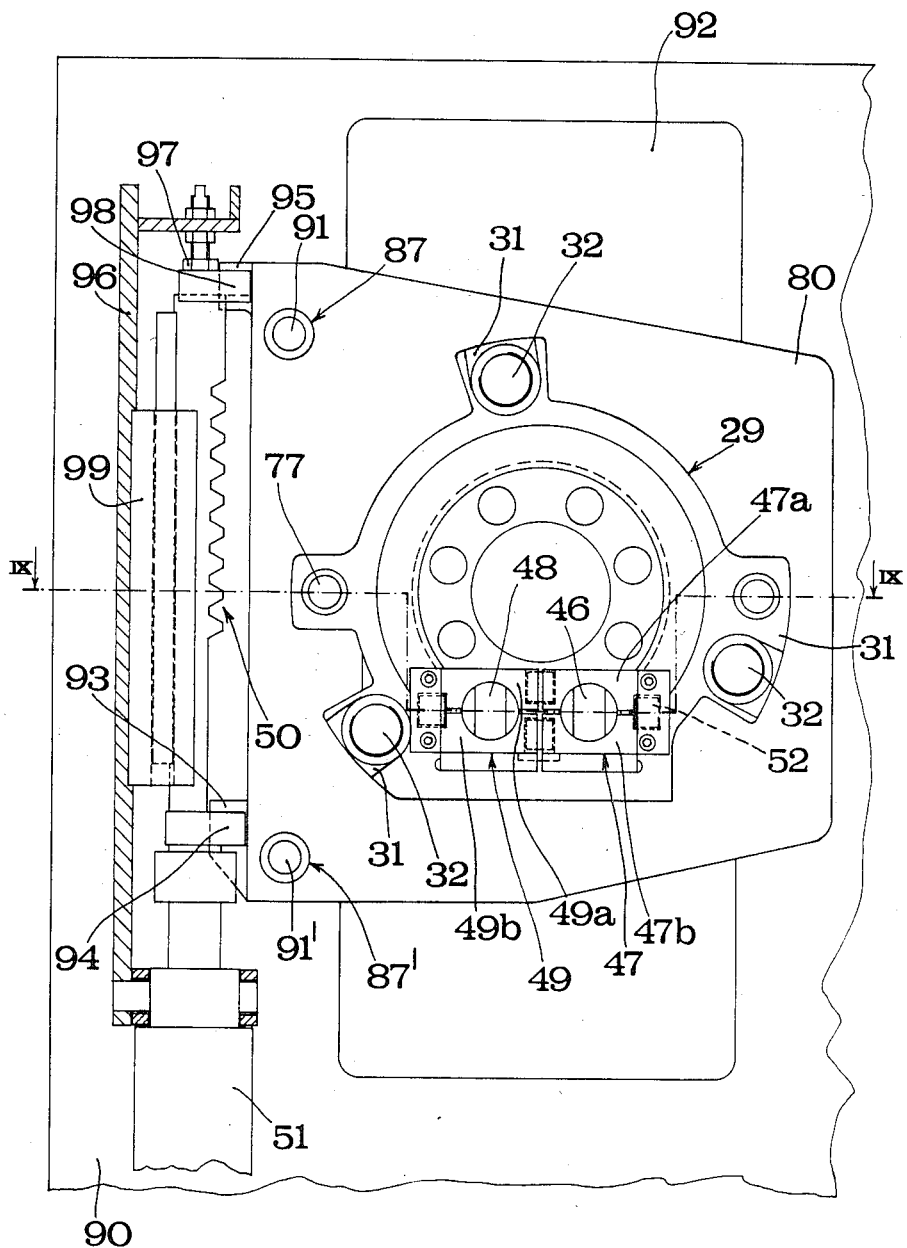
FIG. 8 is a front view of a tool connection plate accommodated in a toolholder magazine and forming part of the preferred embodiment of the mechanism according to the invention.
Figure 12:
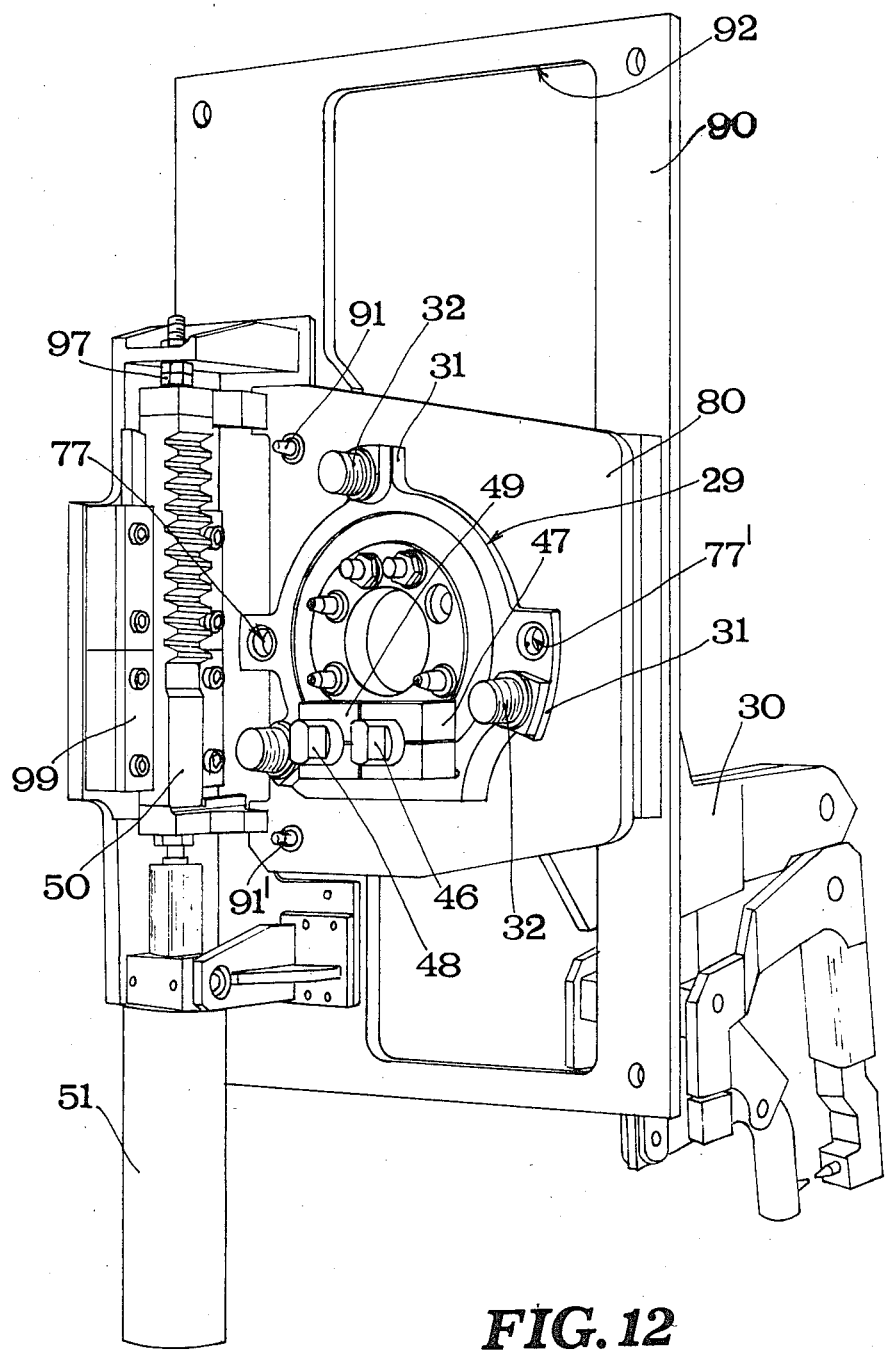
FIG. 12 is a perspective view similar to FIG. 11, but with the tool located in the magazine.

Firmly secured to welding gun 30 (FIG. 2) is a connection plate 80 having a pair of holes 87, 87' (FIG. 8) and a center projection 29 provided with three equidistantly spaced radial lugs 31 each mounting a resilient retainer comprising a cylindrical cartridge 32 accommodating Belleville springs 35 (FIG. 4) acting on pressure balls 33 acting in a direction opposed to the front of projection 29. Cartridges 32 are mounted on radial lugs 31 by means of ring nuts 88 (FIG. 5). Projection 29 has a pair of holes 77, 77' (FIG. 12) arranged to be coupled to plugs 72, 72' (FIGS. 1 and 3) of hollow cylinder 16 when the latter is moved forwardly toward connection plate 80 as will be described hereinafter. Further, projection 29 has connectors 84, 86 (FIG. 3) corresponding to connectors 74, 76 of body 19 and connected to the appropriate circuits of the welding gun or other associated tool. The connectors of the cooling circuit are preferably provided with check valves.

Projection 29 is provided with an aperture in which a pair of insulating tabs 47, 49 (FIG. 12) is mounted, each of which is formed of two portions 47a, 47b and 49a, 49b (FIG. 8) which are depressed to form retaining seats for plugs 46 and 48 constituting the electric connection terminals of the power circuit of welding gun 30. Tabs 47, 49 are sprung by elastic elements 52, preferably of rubber, adapted to impart resiliency to the location of the plugs. Plugs 46, 48 terminate forwardly with a flattened cross section 46a, 46b and 48a, 48b (FIG. 9) and are spaced from each other so as to fit between plates 44a, 44b and the respective jaws 53, 55 when hollow cylinder 16 is moved forwardly toward projection 29 as will be described hereinafter.

As shown particularly in FIGS. 8, 9, 11 and 12, connection plate 80 firmly secured to tool 30 is adapted to be received in a toolholder magazine constituted by a frame 90 having a sufficiently wide aperture 92 to permit the tool to pass but not the connection plate 80. Frame 90 is mounted in a predetermined fixed position with respect to the robot to permit frontal approach of the toolholder head of the latter. A pair of pins 91, 91' (FIG. 8) firmly secured to frame 90 fits in holes 87 in connection plate 80 to support and locate the latter.

Figure 10:
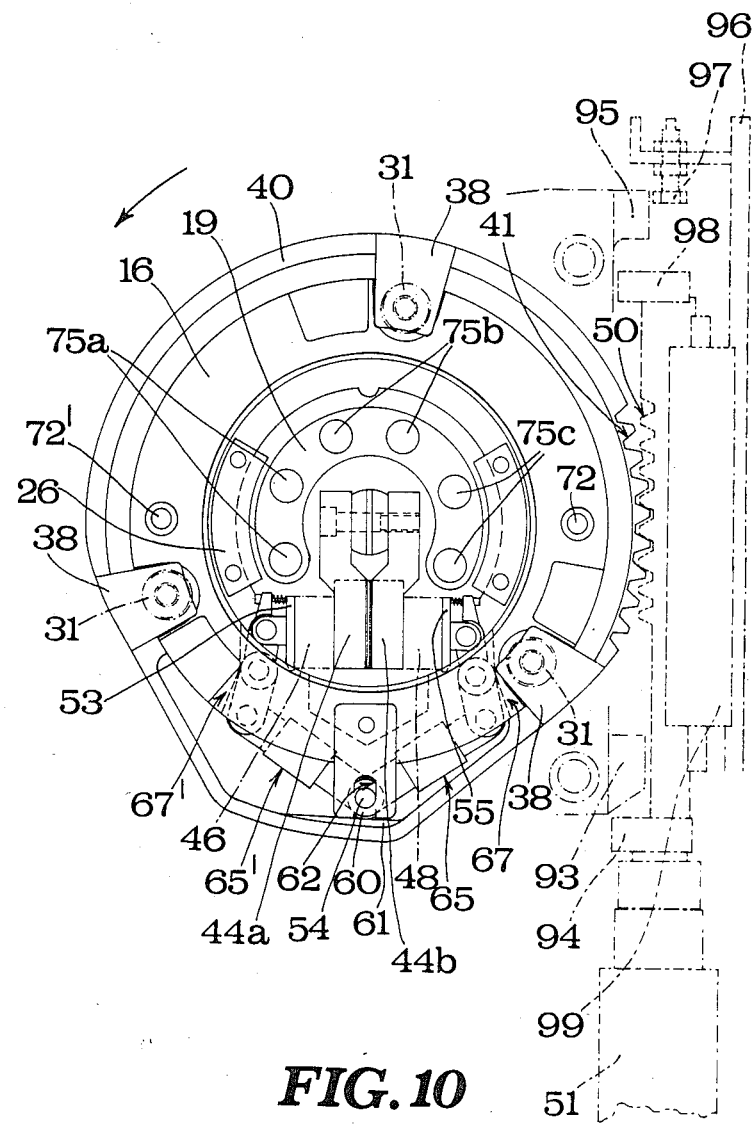
FIG. 10 is a front view similar to FIG. 6, but with the device in the locked position of operation.
Figure 11:
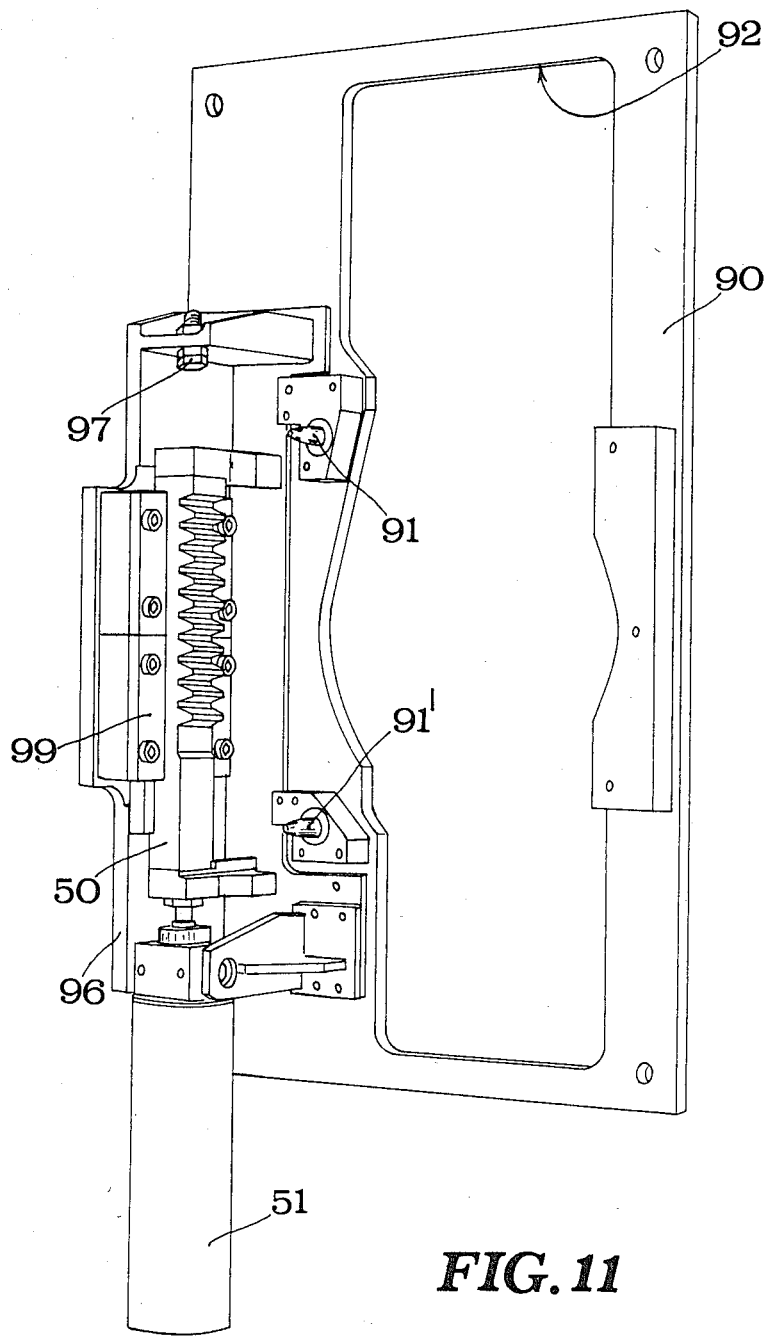
FIG. 11 is a perspective view of the toolholder magazine forming part of the mechanism according to the invention.

As shown in FIG. 10, magazine 90 comprises an actuator for segmental crown gear 40, which is composed of a pneumatic cylinder 51 whose piston rod is formed integrally with a rack 50 and a pair of tabs 94 and 98 adapted to engage abutment surfaces 93, 95 on connection plate 80. Rack 50 is contained by guide 99 firmly secured to magazine 90 by an upright support member 96 provided with a bracket carrying an abutment 97 for adjusting the stroke of rack 50 which in the unlocked position engages said abutment.

OPERATION OF THE MECHANISM

With a tool located on magazine 90 (FIGS. 8, 9 and in particular 12), toolholder head 10 without tool and segmental crown gear 40 in the unlocked position, the control mechanism of the robot moves the coupling device mounted on toolholder head 10 (comprising hollow cylinder 16, center body 19 and segmental crown gear 40) forwardly toward projection 29 of connection plate 80, with plugs 72, 72' aligned with the corresponding holes 77, 77' on the projection, until the plugs are engaged in the holes. Rack 50 engages abutment 97 with tabs 94, 98 engaging connection plate 80 to prevent it from tilting away from magazine 90. Abutment 97 has been previously adjusted so that the teeth 41 of segmental crown gear 40 will fit in without interference between the teeth of rack 50 while claws 38 pass free of radial lugs 31 along the profile of projection 29 and resilient retainers 32 projecting from lugs 31 are received in recesses 18. At the same time plugs 46, 48 are inserted between plates 44a, 44b and jaws 53, 55 while the various connectors on body 19 and the projection 29 snugly fit one another to establish the auxiliary connections.

As actuator cylinder 51 is actuated in timed relation with the working program of the robot to remove rack 50 from abutment 97, segmental crown gear 40 is rotated into the locked position to move claws 38 behind lugs 31 against the action of the resilient retainers 32. Under the reaction pressure thus produced annular surface 16a of hollow cylinder 16 is pressed against projection 29 and this together with the engagement of plugs 72, 72' in holes 77, 77' ensures a firm connection of connection plate 80 with the toolholder head of the robot to form a rigid unit.

During the locking operation cam surface 61 of segmental crown gear 40 acts on cam follower 60 to urge jaws 53, 55 against plugs 46, 48 with a high clamping force due to the resiliency of struts 65, 65', this force being independent of play and tolerances due to wear of the parts. The spring elements 52 between tabs 47, 49 permit the plugs 46, 48 to yield without strain to this clamping pressure and to adapt themselves to the contact surfaces.

Translation of rack 50 releases retaining tabs 94, 98 from their engagement with connection plate 80, rendering the latter free to be removed from support pins 91, 91' and thus from magazine 90 as the toolholder head of the robot moves away in the same direction in which it had approached.

For redepositing the tool in the magazine, the toolholder head of the robot is moved again in timed relation with the working program close to the magazine so that the tool can pass through the frame 90, pins 91, 91' are inserted in holes 87, 87' of connection plate 80 and the teeth 41 of segmental crown gear 40 mesh with rack 50 which was left in the locked position. By actuation of actuator cylinder 51 and its movement to the unlocked position, tabs 94, 98 are moved back into the plate retaining position while the claws 38 of segmental crown gear 40 are released from radial lugs 31 and the jaws 53, 55 open to release the plugs 46, 48. Now the toolholder head of the robot can move away leaving the tool in the magazine.

Thus, with the described mechanism the tool on an industrial robot can be changed in timed relation with the working program by mounting on the toolholder head a coupling device of reduced overall dimensions and weight due to the fact that its actuator means, instead of being arranged on the toolholder head, are arranged on the toolholder magazine where they do not cause any trouble. The present automatic tool changing mechanism also permits to establish service connections to the tool and particularly electric power feeding connections for feeding high power at low tension by means of a high pressure electric contact system actuated by the coupling device itself simultaneously with the engagement of the tool.

In practice an operative plant will comprise several juxtaposed toolholder magazines, each with a different tool, but the same connection plate. Thus, the robot acquires the operative characteristics of a machining center.

Although a preferred embodiment of the invention has thus been described in detail and illustrated in the accompanying drawings, it is to be understood that the invention is not limited to this precise embodiment and that numerous changes and modifications obvious to one skilled in the art may be made therein without departing from the scope of the invention as defined by the appended claims. In particular, the actuator means for the segmental crown gear, mounted on the toolholder magazine, may vary and may consist of any of the known devices for producing rotation of a rotatable member. Also the execution of the jaw clamping means may undergo variations, particularly in case of minor power to be handled. Non-essential parts of the mechanism may be omitted; for example, all or part of the connectors for service circuits, or the electric power feed device where the tools used do not require power.

I claim:

1. An automatic tool changing mechanism for industrial robots with a toolholder head having a plurality of axes of movement and provided with a toolholder end flange, said mechanism comprising a connection plate firmly secured to a tool and having a projection provided with a plurality of radial lugs and a corresponding plurality of resiliently compressible retainers mounted respectively on each radial lug;

a coupling device for coupling said tool to the robot by means of said connection plate, said coupling device comprising a hollow cylinder firmly anchored to said toolholder end flange of said toolholder head of the robot, and an annular surface adapted to engage said projection of said connection plate of said tool, and a cylindrical outer surface rotatably supporting a segmental crown gear provided forwardly with a plurality of claws adjacent said radial lugs of said connection plate and peripherally with engagement means for rotating said segmental crown gear by means of external actuator means between a first unlocked position and a second locked position;

a toolholder magazine comprising a frame arranged in a predetermined fixed position with respect to the robot and accommodating said tool with said connection plate in a predetermined position and having an actuator member engaging said engagement means on said segmental crown gear when said coupling device is in a position engaging said projection for rotating said segmental crown gear between said unlocked and locked positions;

the arrangement being such that by moving said coupling device forwardly close to said connection plate of said tool located in said toolholder magazine, with said segmental crown gear in said unlocked position, said claws are released by said radial lugs and said engagement means of said segmental crown gear are gripped by said actuator member of said toolholder magazine so that when said segmental crown gear is moved into said locked position by actuation of said actuator member, said claws move behind said radial lugs to grip said resiliently compressible retainers and thus create a reaction pressure between said annular surface of said hollow cylinder and said projection on said connection plate whereas by moving said actuator member in the opposite direction said segmental crown gear is returned to said unlocked position to release said claws and thus said coupling device from said connection plate.

2. An automatic tool changing mechanism as claimed in claim 1, wherein said engagement means on said segmental crown gear comprises a toothed segment and said actuator member on said toolholder magazine comprises a rack moved by a piston rod of an actuator cylinder secured to said toolholder magazine so as to mesh with said toothed segment of said segmental crown gear as said coupling device on said toolholder head moves forwardly up to said connection plate accommodated in said toolholder magazine.

3. An automatic tool changing mechanism as claimed in claim 1, for an industrial robot having a pair of electric power feeding conductors extending through said toolholder head, wherein said hollow cylinder has in its center area a pair of conductor plates provided with respective opposed electric contact surfaces extending parallel to the axis of said hollow cylinder, with said conductor plates connected to said electric power feeding conductors in said toolholder head, said conductor plates being provided with a pair of opposed jaws each facing one of said conductor plates and supported by pressure means mounted on said hollow cylinder for moving said opposed jaws against said conductor plates on rotation of said segmental crown wheel from said unlocked to said locked position; and said connection plate of said tool carries a pair of electric contact plugs yieldingly supported in such a position as to be inserted each between one of said conductor plates and one of said jaws as said coupling device moves forwardly up to said connection plate of said tool with said segmental crown gear in said unlocked position, said electric contact plugs being restrained between said conductor plates and said jaws during movement of said segmental crown gear into said locked position.

4. An automatic tool changing mechanism as claimed in claim 3, wherein said pressure means of said jaws comprises a pair of rocker arms pivotally mounted in a fixed point of said hollow cylinder and each carrying at one end one of said jaws, with the opposed ends of said rocker arms pivotally connected to respective struts connected to each other on a cam follower slidably engaging a cam surface in the interior of said segmental crown gear so as to cause compression of said struts on rotation of said segmental crown gear from said unlocked to said locked position for moving said jaws up to said conductor plates.

5. An automatic tool changing mechanism as claimed in claim 3, wherein each of said electric contact plugs of said tool is secured to a respective insulating tab accommodated in an aperture of said projection of said connection plate with the interposition of an elastic element for imparting resilient support to said electric contact plugs.

6. An automatic tool changing mechanism as claimed in claim 1, wherein said engagement means on said segmental crown gear comprises a toothed segment and said actuator member on said toolholder magazine comprises a rack moved by a piston rod of an actuator cylinder secured to said toolholder magazine and said rack carries tabs engaging abutment surfaces on said connection plate when the latter is received in said toolholder magazine and said rack is in an unlocked position, said tabs being released from engagement with said abutment surfaces when said actuator cylinder is in a locked position.

7. An automatic tool changing mechanism as claimed in claim 1, wherein each of said resiliently compressible retainers comprises a cylindrical cartridge secured to an associated one of said radial lugs and containing a plurality of Belleville springs acting upon a pressure ball.

8. An automatic tool changing mechanism as claimed in claim 1, wherein said toolholder magazine is forwardly provided with pins insertable in holes in said connection plate of said tool for supporting said connection plate in said toolholder magazine and to provide reaction means against rotation of said segmental crown gear.

9. An automatic tool changing mechanism as claimed in claim 1, wherein said hollow cylinder is provided with plugs insertable in holes in said projection of said connection plate of said tool by moving said coupling device up to said tool received in said toolholder magazine to provide reaction means against rotation of said segmental crown gear.

10. An automatic tool changing mechanism as claimed in claim 1, wherein said hollow cylinder and said projection of said connection plate each have a center area provided with respective corresponding connectors adapted to be snugly fitted to one another by moving said coupling device forwardly up to said connection plate, said connectors being connected to auxiliary feed circuits of said robot and tool, respectively.

11. An automatic tool changing mechanism as claimed in claim 10, wherein said connectors on said hollow cylinder are supported by a cylindrical body fitted centrally into the interior of said hollow cylinder.

12. An automatic tool changing mechanism as claimed in claim 1, wherein there are three of each of said resiliently compressible retainers, radial lugs and claws equidistantly peripherally spaced around the axis of said hollow cylinder.

* * * * *